US010788885B2

(12) United States Patent
Fossati

(10) Patent No.: US 10,788,885 B2
(45) Date of Patent: Sep. 29, 2020

(54) CIRCUIT

(71) Applicant: Hewlett-Packard Development Company, L.P., Houston, TX (US)

(72) Inventor: Humberto M. Fossati, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 342 days.

(21) Appl. No.: 15/310,670

(22) PCT Filed: May 28, 2014

(86) PCT No.: PCT/US2014/039699
§ 371 (c)(1),
(2) Date: Nov. 11, 2016

(87) PCT Pub. No.: WO2015/183252
PCT Pub. Date: Dec. 3, 2015

(65) Prior Publication Data
US 2017/0075410 A1 Mar. 16, 2017

(51) Int. Cl.
*G06F 1/26* (2006.01)
*G06F 1/32* (2019.01)
*G06F 1/3293* (2019.01)
*G06F 1/3296* (2019.01)

(52) U.S. Cl.
CPC ............. *G06F 1/3293* (2013.01); *G06F 1/26* (2013.01); *G06F 1/266* (2013.01); *G06F 1/32* (2013.01); *G06F 1/3296* (2013.01)

(58) Field of Classification Search
None
See application file for complete search history.

(56) References Cited

U.S. PATENT DOCUMENTS

| 2009/0132730 | A1 | 5/2009 | Kim et al. |
| 2009/0160868 | A1 | 6/2009 | Yato |
| 2010/0135429 | A1 | 6/2010 | Nakajima et al. |
| 2012/0023344 | A1 | 1/2012 | Miyanaga |
| 2012/0036284 | A1 | 2/2012 | Tao et al. |
| 2012/0080954 | A1 | 4/2012 | Gachon et al. |

(Continued)

FOREIGN PATENT DOCUMENTS

| CN | 101755249 | 2/2013 |
| CN | 101849401 | 8/2013 |

(Continued)

*Primary Examiner* — Tanh Q Nguyen
(74) *Attorney, Agent, or Firm* — Rathe Lindenbaum LLP

(57) ABSTRACT

Examples of a circuit, a method for use in a circuit and a machine-readable non-transitory storage medium including instructions executable by a processor of a circuit are disclosed herein. An example of the machine-readable non-transitory storage medium includes instructions that, when executed by a processor of a circuit, cause the processor to: identify a first predetermined electrical state on a first line of an interface, identify a second predetermined electrical state on a second line of the interface, and selectively couple a supply of power to the second line of the interface when the first predetermined electrical state is identified on the first line of the interface and the second predetermined electrical state is identified on the second line of the interface.

19 Claims, 7 Drawing Sheets

(56) References Cited

U.S. PATENT DOCUMENTS

| | | |
|---|---|---|
| 2012/0226921 A1 | 9/2012 | Kim |
| 2012/0229076 A1* | 9/2012 | Zhu |
| 2017/0017282 A1* | 1/2017 | Toba ........................ G06F 1/266 |
| 2017/0075410 A1* | 3/2017 | Fossati .................... G06F 1/266 |

FOREIGN PATENT DOCUMENTS

| | | |
|---|---|---|
| CN | 203151655 U | 8/2013 |
| CN | 102655580 | 10/2017 |

* cited by examiner

116

130 — Actuating a switch to selectively couple and decouple the supply of power to the second line of the interface 132 — Moving a switch between a first position and a second position to select one of the second predetermined level and the fourth predetermined level 134 — Dividing a voltage source to selectively supply one of a plurality of voltages that define a value of the first electrical parameter 136 — Moving a switch coupled to the supply of power and the second line of the interface to one of a plurality of different positions to selectively couple the second line of the interface to one of the different values of the supply of power 138 — Executing a set of instructions on a machine-readable non-transitory storage medium via a processor to at least measure the first electrical parameter, measure the second electrical parameter, couple the supply of power to the second line of the interface or decouple the supply of power to the second line of the interface

FIG. 5

CIRCUIT

CROSS-REFERENCE TO RELATED APPLICATION

This application is a U.S. National Stage Application of and claims priority to International Patent Application No. PCT/US2014/039699, filed on May 28, 2014, and entitled "CIRCUIT," which is hereby incorporated by reference in its entirety.

BACKGROUND

Consumers appreciate quality and value in their electronic devices. They also appreciate cost effective solutions that provide enhanced functionality. Designers and manufacturers may, therefore, endeavor to create and provide electronic devices directed toward one or more of these objectives.

BRIEF DESCRIPTION OF THE DRAWINGS

The following detailed description references the drawings, wherein:

FIG. 5 is an example of additional elements of the method for use in a circuit of FIG. 4 in accordance with an implementation.

DETAILED DESCRIPTION

Figure 1:
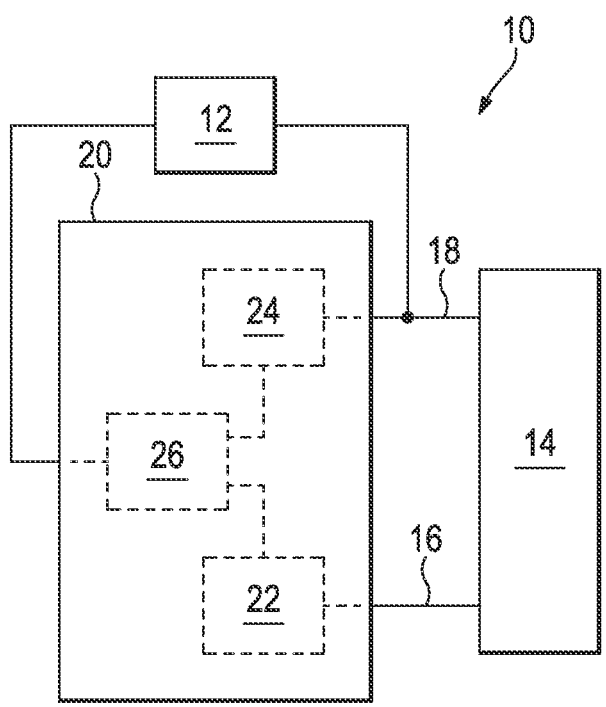
FIG. 1 is an example of a circuit in accordance with an implementation.

Certain types of electronic devices are designed to connect to one another in order to achieve a specific purpose. For example, a video projector may connect to a computer so that data on the computer may be viewed by others. As another example, a printer may connect to computer so that data on the computer may be printed. As an additional example, a camera may connect to a computer to provide video and audio for a teleconference.

With such connections, each electronic device needs to have its own supply of power. This supply of power can be in the form of an alternating current (AC), such as an AC wall outlet, a corresponding plug, and a power supply, or a battery that discharges to provide the supply of power. These separate supplies of power for each electronic device add to the cost and complexity of such electronic devices. In the case where AC power plugs and power supplies need to be used, it also adds clutter to a desktop or other working environment.

Examples directed to addressing these issues associated with each electronic device requiring its own supply of power are shown in FIGS. 1-7. These examples provide a relatively simpler and more cost-effective solution to the supply of power for connected electrical devices that also reduces clutter on desktops and other working environments.

As used herein, the term "circuit" represents a interconnection of elements such as resistors, inductors, capacitors, voltage sources, current sources, transistors, diodes, application specific integrated circuits (ASICs), processors, controllers, switches, transformers, gates, timers, relays, multiplexors, interfaces, connectors, cables, wires, comparators, amplifiers, filters, and/or modules having these elements. A circuit may utilize constant, alternating, continuous, or discrete signals, as well as any combination thereof. As used herein the term "interface" represents a shared boundary or connection across which information, control signals, addresses and/or power is transferred.

As used herein the term High-Definition Multimedia Interface (HDMI) represents an industry standard audio/video interface for transferring uncompressed video data and compressed or uncompressed digital audio data from an HDMI-compliant source electronic device to a compatible destination electronic device. As used herein the term "electronic device" includes a computer, tablet, monitor, projector, television, display, speaker, audio component, printer, scanner, microphone, camera, or combination thereof.

As used herein, the term "processor" represents an instruction execution system such as a computer-based system, an Application Specific Integrated Circuit (ASIC), a computing device, a machine readable instruction system, or any combination thereof, that can fetch or obtain the logic from a non-transitory storage medium and execute the instructions contained thereon. "Processor" can also include any controller, state-machine, microprocessor, logic control circuitry, cloud-based utility, service or feature, any other analogue, digital and/or mechanical implementation thereof, or any combination of the forgoing.

As used herein, the term "non-transitory storage medium" represents any medium that can contain, store, retain, or maintain programs, code, scripts, information, and/or data. A non-volatile storage medium can include any one of many physical media such as, for example, electronic, magnetic, optical, electromagnetic, or semiconductor media. A non-transitory storage medium can be a component of a distributed system. More specific examples of suitable non-volatile storage media include, but are not limited to, a magnetic computer diskette such as floppy diskettes or hard drives, magnetic tape, a read-only memory (ROM), an erasable programmable read-only memory (EPROM), a flash drive or memory, a compact disc (CD), a digital video disk (DVD), or a memristor.

As used herein, the term "distributed system" represents multiple processors and non-volatile storage media in different locations or systems that communicate via a network, such as the cloud. As used herein, the term "cloud" represents computing resources (hardware and/or machine readable instructions) that are delivered as a service over a network (such as the internet).

An example of a circuit 10 is shown in FIG. 1. As can be seen in FIG. 1, circuit 10 includes a supply of power 12 and an interface 14 including a first line 16 and a second line 18. Circuit 10 also includes a processor 20 including a first component 22 to identify a first predetermined electrical state on first line 16 of interface 14 and a second component 24 to identify a second predetermined electrical state on second line 18 of interface 14.

As can also be seen in FIG. 1, processor 20 of circuit 10 additionally includes a third component 26 to selectively couple supply of power 12 to second line 18 of interface 14 when the first predetermined electrical state is identified on first line 16 of interface 14 and the second predetermined electrical state is identified on the second line 18 of interface 14. Third component 26 does not couple supply of power 12 to second line 18 of interface 14 if either the first predetermined electrical state is not identified on first line 16 by first component 22 or the second predetermined electrical state is not identified on second line 18 by second component 24.

Figure 2:
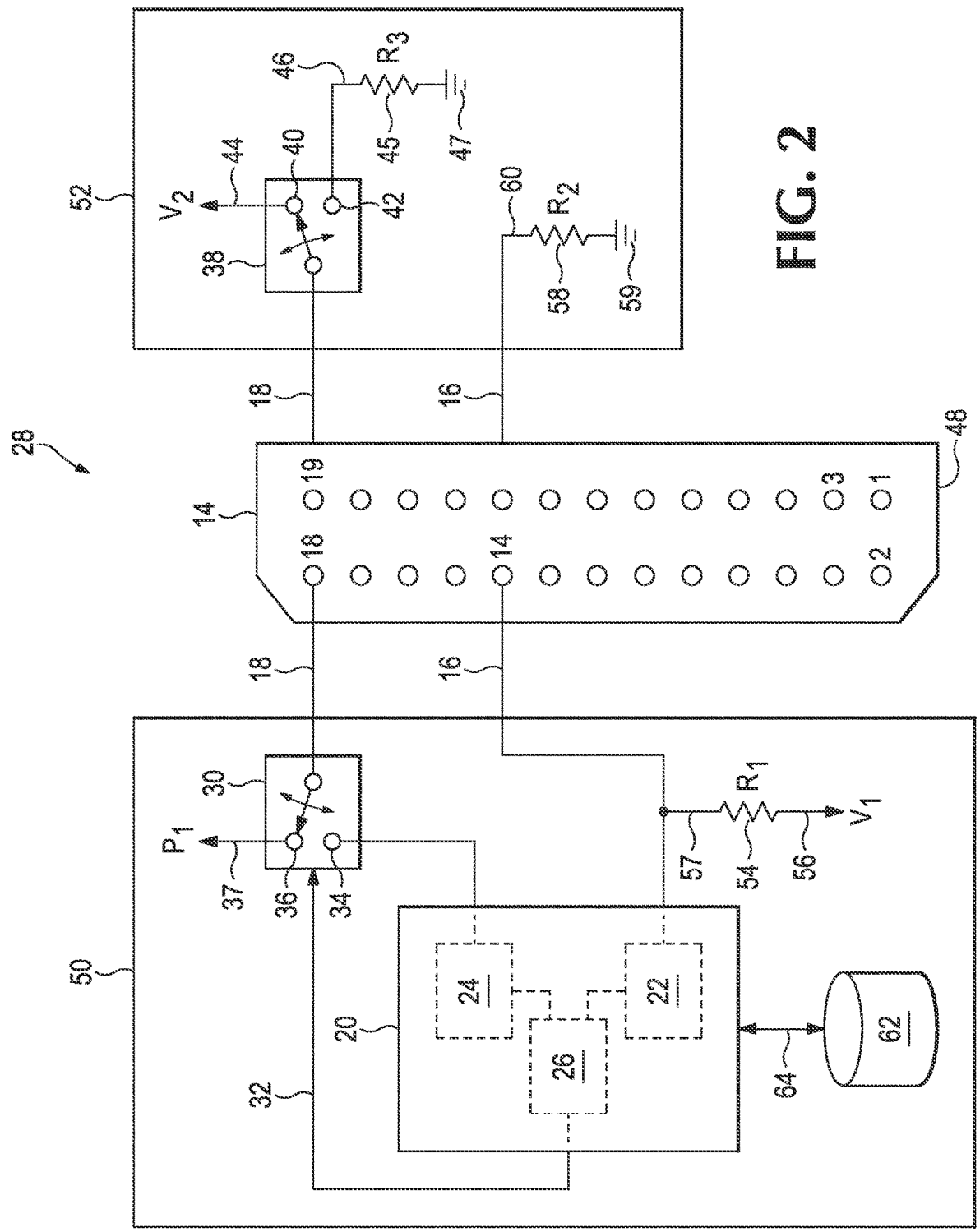
FIG. 2 is an additional example of a circuit in accordance with an implementation.

An example of another circuit 28 is shown in FIG. 2. Where possible, the same reference numerals have been used for the elements of circuit 28 that are the same as the elements of circuit 10. As can be seen in FIG. 2, circuit 28 includes a switch 30 coupled to third component 26 of processor 20, as indicated by arrow 32. Switch 30 is selectively moveable by third component 26 between a first position 34 to couple second line 18 of interface 14 to second component 24 of processor 20 and a second position 36 to coupled second line 18 of interface 14 to supply of power ($P_1$) 37. In this example, supply of power (P1) 37 is five (5) Watts. Switch 30 may be a mechanical switch or an electrical switch.

As can also be seen in FIG. 2, circuit 28 additionally includes a second switch 38 coupled to second component 24 of processor 20 via second line 18 of interface 14. Second switch 38 may be a mechanical switch or an electrical switch. Second switch 38 includes a third position 40 and a fourth position 42 that selectively define a value of the second predetermined electrical state. In this example, third position 40 of second switch 38 defines a logical "high" value ($V_2$) 44, where $V_2$ is five (5) Volts$_{DC}$, and fourth position 42 of second switch 38 defines a logical "low" value 46 via resistor (R3) 45 and ground 47, where R3 has a value of between ten (10) Ohms and 100 Kilo Ohms.

As can additionally be seen in FIG. 2, interface 14 of circuit 28 includes a High-Definition Multimedia Interface 48. First line 16 of circuit 28 includes (i.e., is coupled to) pin 14 of High-Definition Multimedia Interface 48 and second line 18 of circuit 28 includes (i.e., is coupled to) pin 18 of High-Definition Multimedia interface 48. Use of High-Definition Multimedia Interface 48 allows first electronic device 50 to connect to second electronic device 52. First electronic device 50 includes a resistor ($R_1$) 54 that is connected to a voltage source ($V_1$) 56 to define a logical "high" value 57 and second electronic device 52 includes a resistor ($R_2$) 58 that is connected to ground 59 to define a logical "low" value 60. In this example of circuit 28, $R_1$ has a value of between ten (10) and 100 Kilo Ohms, $V_1$ has a value of five (5) Volts$_{DC}$, and $V_2$ has a value of five (5) Volts$_{DC}$.

Upon connection of respective first and second devices 50 and 52 via High-Definition Multimedia Interface 48, first electrical state on first line 16 goes from a logical "high" value to a logical "low" value which is identified by first component 22 of processor 20. This logical "low" value on first line 16 represents the first predetermined electrical state on first line 16. When this first predetermined electrical state is on first line 16, third component 26 of processor 20 actuates switch 30 to first position 34 which allows second component 24 of processor 20 to identify the second electrical state on second line 18. The second electrical state on line 18 is determined by the position of second switch 38. If second switch 38 is in third position 40, then the electrical state of second line 18 is identified by second component 24 of processor 20 as "high" and respective first and second devices 50 and 52 operate according to the industry standard for the High-Definition Multimedia Interface 48.

However, if second switch 38 is in fourth position 42, then the electrical state of second line 18 is identified by second component 24 of processor 20 as "low" which represents the second predetermined electrical state on second line 18. When this second predetermined electrical state is on second line 18, third component 26 of processor 20 actuates switch 30 from first position 34 to second position 36 to selectively couple supply of power ($P_1$) 37 to second line 18 of interface 14. This allows electronic device 50 to supply power to electronic device 52 via second line 18 which is connected to pin 18 of High-Definition Multimedia Interface 48, eliminating the need for a separate supply of power for electronic device 52. This provides a relatively simpler and more cost-effective solution to the supply of power for respective connected electrical devices 50 and 52 that also reduces clutter on desktops and other working environments. Respective first and second electronic devices 50 and 52 also continue to operate according to the industry standard for the High-Definition Multimedia Interface 48 by utilizing their connection via pins 1-13, 15-17, and 19.

As can further be seen in FIG. 2, circuit 28 includes a machine-readable non-transitory storage medium 62. Medium 62 includes instructions that, when executed by processor 20, as indicated by double-headed arrow 64, cause processor 20 to identify the first predetermined electrical state, identify the second predetermined electrical state and/or selectively couple supply of power 37 to second line 18 of interface 14.

Figure 3:
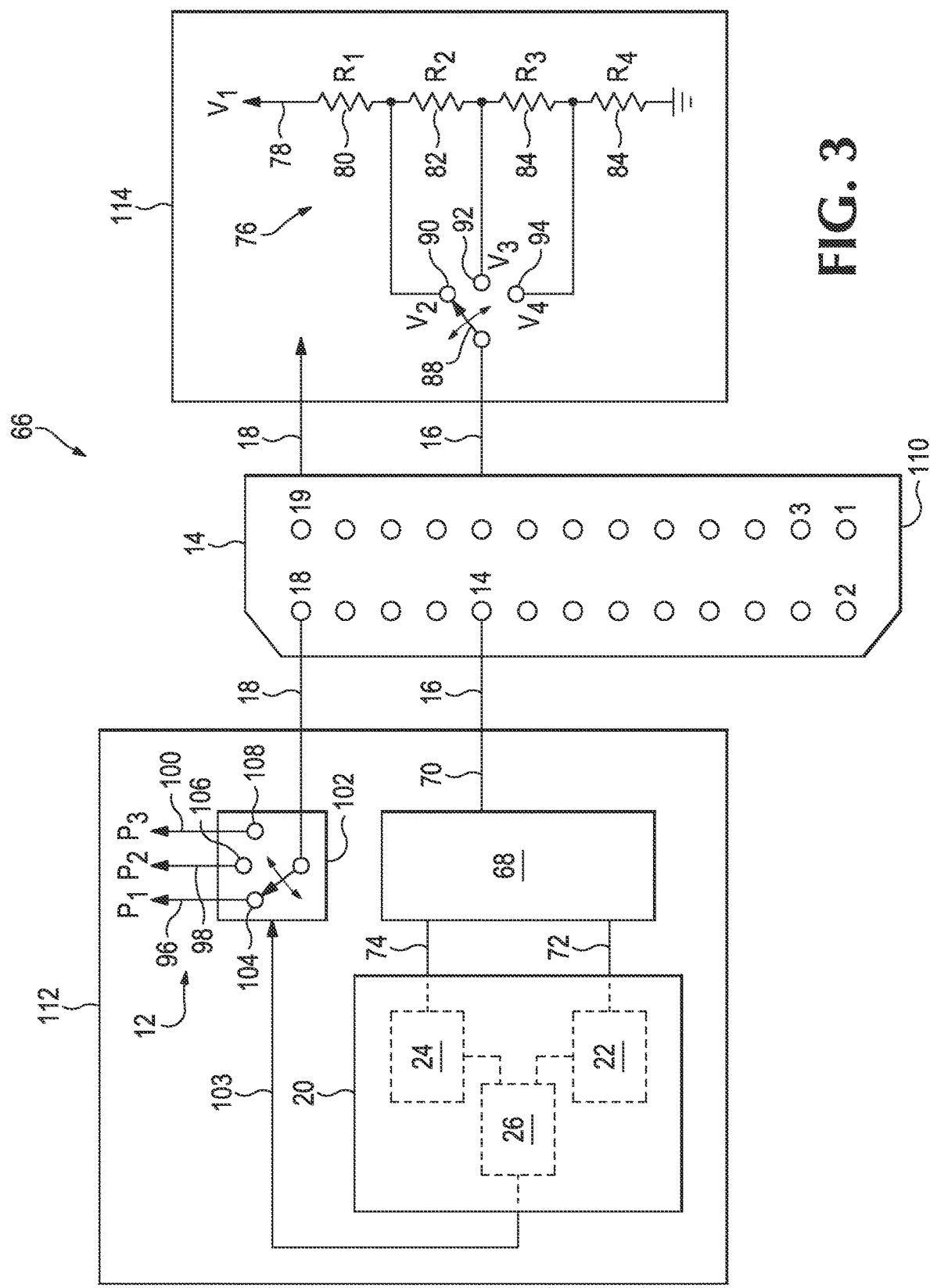
FIG. 3 is a further example of a circuit in accordance with an implementation.

A further example of a circuit 66 is shown in FIG. 3. Where possible, the same reference numerals have been used for the elements of circuit 66 that are the same as the elements of circuit 10. As can be seen in FIG. 3, circuit 66 includes an analog to digital convertor 68 having an input 70 coupled to first line 16 of interface 14, a first output 72 coupled to first component 22 of processor 20 so that first component 22 can identify a first electrical value on first output 72, and second output 74 coupled to second component 24 of processor 20 so that second component 24 can identify a second electrical value on second output 74. Circuit 66 also includes a voltage divider 76 coupled to input 70 of analog to digital convertor 68 via first line 16. Voltage divider 76 includes a voltage source ($V_1$) 78, a plurality of respective resistors ($R_1$) 80, ($R_2$) 82, ($R_3$) 84, and ($R_4$) 86, and a switch 88 to selectively supply one of a plurality of voltages ($V_2$) 90, ($V_3$) 92, and ($V_4$) 94 that define a third electrical value. In this example of circuit 66, each of resistors $R_1$, $R_2$, $R_3$, and $R_4$ have a value of ten (10) Kilo Ohms and $V_1$ has a value of five (5) Volts$_{DC}$. Switch 88 may be a mechanical switch or an electrical switch.

As can also be seen in FIG. 3, supply of power 12 includes a plurality of different power values ($P_1$) 96, ($P_2$) 98, and ($P_3$) 100 and circuit 66 also includes a switch 102. In this example of circuit 66, $P_1$ has a value of ten (10) Watts, $P_2$ has a value of five (5) Watts, arnid $P_3$ has a value of two-and-a-half (2.5) Watts. Switch 102 ma be a mechanical switch or an electrical switch. Switch 102 is coupled to second line 18 of interface 14, supply of power 12, and third component 26 of processor 20. Switch 102 is moveable by third component 26, as indicated by arrow 103, to one of a plurality of positions 104, 106, and 108, based on the first electrical value on first output 72 of analog to digital convertor 68 and the second electrical value on second output 74 of analog to digital convertor 68, to selectively couple second line 18 of interface 14 to one of the different power values ($P_1$) 96, ($P_2$) 98, and ($P_3$) 100 of supply of power 12, as discussed more below.

As can additionally be seen in FIG. 3, interface 14 of circuit 66 includes a High-Definition Multimedia interface 110. First line 16 of circuit 66 is coupled to pin 14 of High-Definition Multimedia interface 110 and second line 18 of circuit 66 is coupled to pin 18 of High-Definition Multimedia Interface 110. Use of High-Definition Multimedia Interface 110 allows third electronic device 112 to connect to fourth electronic device 114. Upon connection of respective third and fourth electronic devices 112 and 114 via High-Definition Multimedia Interface 110, one of the three voltages ($V_2$) 90, ($V_3$) 92, or ($V_4$) 94 that define the third electrical value is supplied to input 70 of analog to digital convertor 68. In this example of circuit 66, $V_2$ has a value of three-and-three-quarter (3.75) Volts, $V_3$ has a value of two-and-a-half (2.5) Volts, and $V_4$ has a value of one-and-a-quarter (1.25) Volts. Based on this voltage on input 70, analog to digital convertor 68 outputs a particular combination first and second electrical values on respective first and second outputs 72 and 74 that are identified by respective first and second components 22 and 24 of processor 20.

Third component 26 of processor 20 then actuates switch 102 to one of positions 104, 106 or 108, based on the particular combination of first and second electrical values on respective first and second outputs 72 and 74 identified by respective first and second components 22 and 24, to selectively couple second line 18 of interface 14 to one of the different power values ($P_1$) 96, ($P_2$) 98, and ($P_3$) 100 of supply of power 12. This allows third electronic device 112 to supply power to fourth electronic device 114 via second line 18 which is connected to pin 18 of High-Definition Multimedia Interface 110, eliminating the need for a separate supply of power for fourth electronic device 114. This provides a relatively simpler and more cost-effective solution to the supply of power for respective connected electrical devices 112 and 114 that also reduces clutter on desktops and other working environments. Respective third and fourth electronic devices 112 and 114 also continue to operate according to the industry standard for the High-Definition Multimedia Interface 110 by utilizing their connection via pins 1-13, 15-17, and 19.

Figure 4:
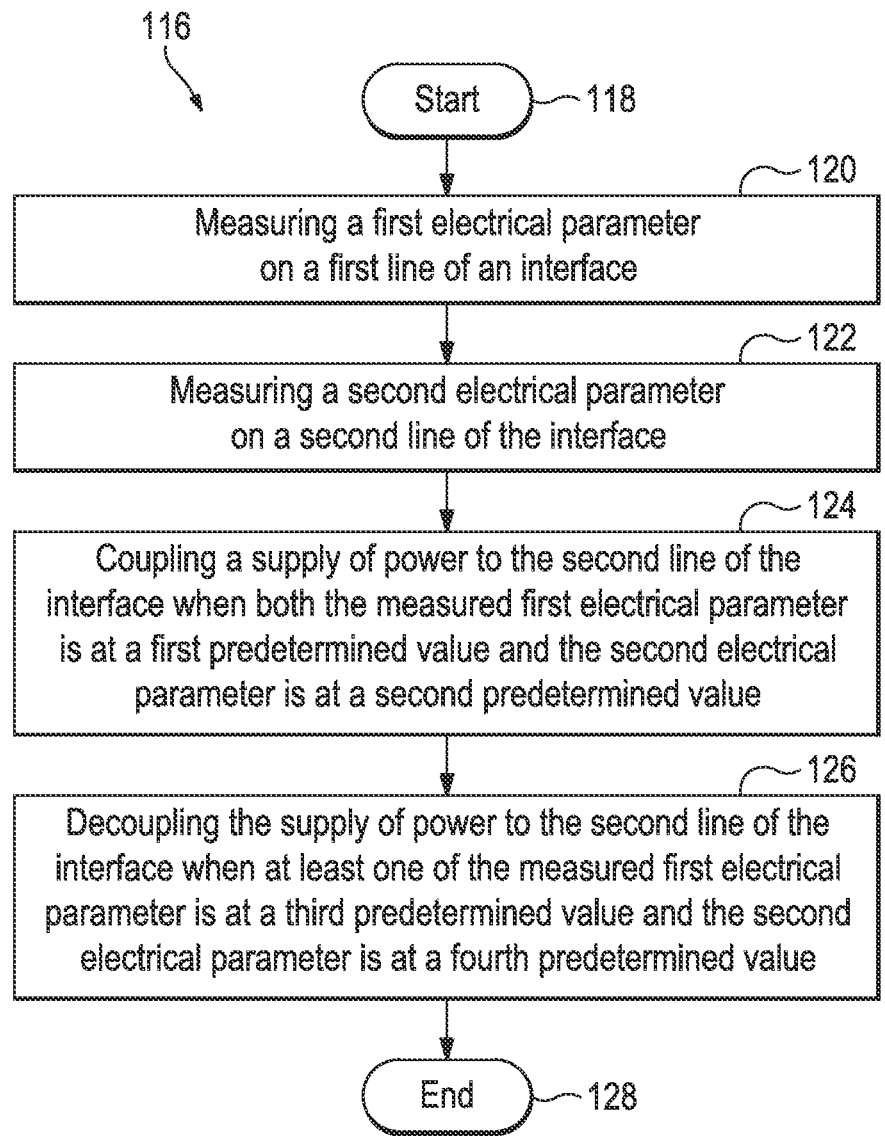
FIG. 4 is an example of a method for use in a circuit in accordance with an implementation.

An example of a method 116 for use in a circuit is shown in FIG. 4. As can be seen in FIG. 4, method 116 starts 118 by measuring a first electrical parameter on a first line of an interface, as indicated by block 120, and measuring a second electrical parameter on a second line of the interface, as indicated by block 122. Method 116 continues by coupling a supply of power to the second line of the interface when both the measured first electrical parameter is at a first predetermined value and the second electrical parameter is at a second predetermined value, as indicated by block 124. Method 116 further continues by decoupling the supply of power to the second line of the interface when at least one of the measured first electrical parameter is at a third predetermined value and the second electrical parameter is at a fourth predetermined value, as indicated by block 126. Method 116 then ends 128.

The first predetermined value of the first electrical parameter may correspond to the logical "low" value on first line 16 of circuit 28 and the second predetermined value of the second electrical parameter may correspond to the logical "low" value on second line 18 of circuit 28. The third predetermined value of the first electrical parameter may correspond to the logical "high" value on first line 16 of circuit 28 and the fourth predetermined value of the second electrical parameter may correspond to the logical "high" value on second line 18 of circuit 28.

An example of additional elements of method 116 for use in a circuit is shown FIG. 5. As can be seen in FIG. 5, method 116 may include actuating a switch to selectively couple and decouple the supply of power to the second line of the interface, as indicated by block 130. Additionally or alternatively, method 116 may include moving a switch between a first position and a second position to select one of the second predetermined level and the fourth predetermined level, as indicated by block 132.

Method 116 may also include dividing a voltage source to selectively supply one of a plurality of voltages that define a value of the first electrical parameter, as indicated by block 20. In some examples of method 116, the supply of power includes a plurality of different values and method 116 further includes moving a switch coupled to be supply of power and the second line of the interface to one of a plurality of different positions to selectively couple the second line of the interface to one of the different values of the supply of power, as indicated by block 136. Method 116 may further include executing a set of instructions on a machine-readable non-transitory storage medium via a processor to measure the first electrical parameter, measure the second electrical parameter, couple the supply of power to the second line of the interface and/or decouple the supply of power to the second line of the interface, as indicated by block 138.

Figure 6:
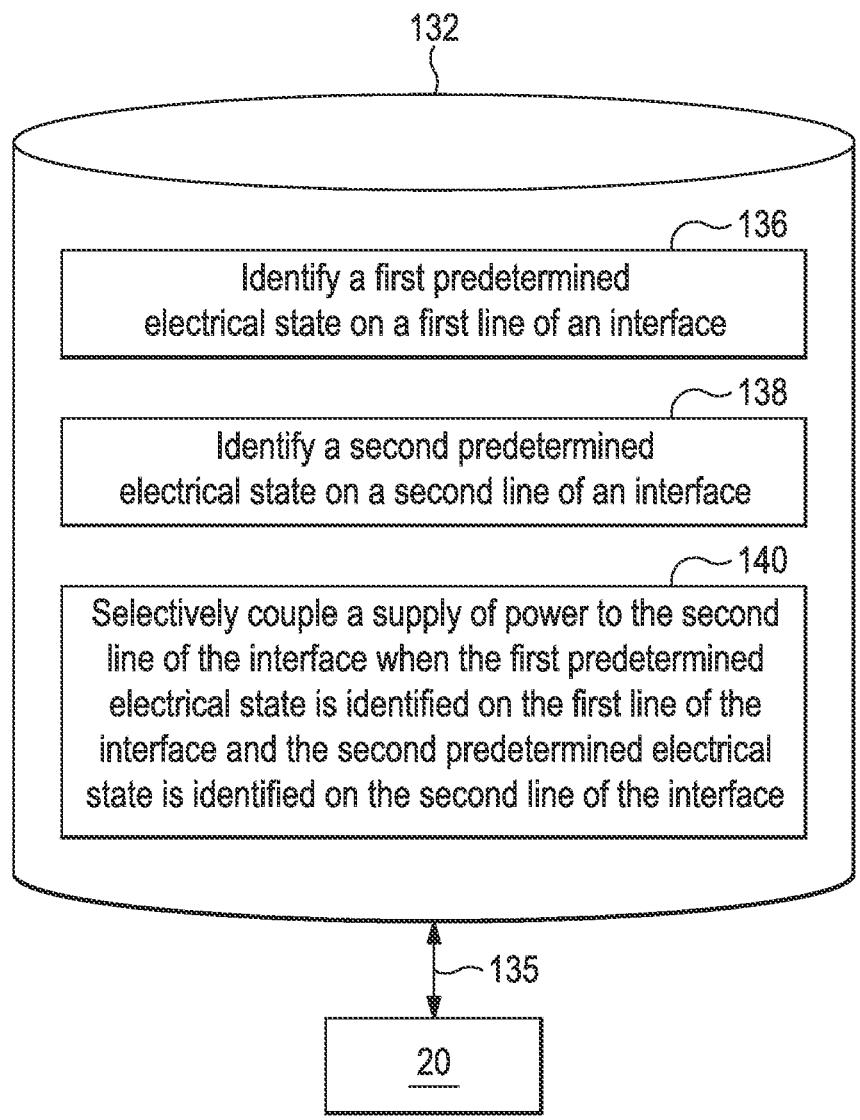
FIG. 6 is an example of a machine-readable non-transitory storage medium including instructions executable by a processor of a circuit in accordance with an implementation.

An example of a machine-readable non-transitory storage medium 132 including instructions executable by processor 20 of a circuit, as indicated by double-headed arrow 135, is shown in FIG. 6. As can be seen in FIG. 6, machine-readable non-transitory storage medium 132 includes instructions that, when executed by processor 20 of the circuit, cause processor 20 to identify a first predetermined electrical state on first line of an interface, as indicated by block 136, and identify a second predetermined electrical state on a second line of the interface, as indicated by block 138. As can also be seen in FIG. 6, machine-readable non-transitory storage medium 132 includes additional instructions that, when executed by processor 20 of the circuit, cause processor 20 to selectively couple a supply of power to the second line of the interface when the first predetermined electrical state is identified on the first line of the interface and the second predetermined electrical state is identified on the second line of the interface, as indicated by block 140. The first predetermined electrical state may correspond to the logical "low" value on first line 16 of circuit 28 and the second predetermined electrical state may correspond to the logical "low" value on second line 18 of circuit 28.

Figure 7:
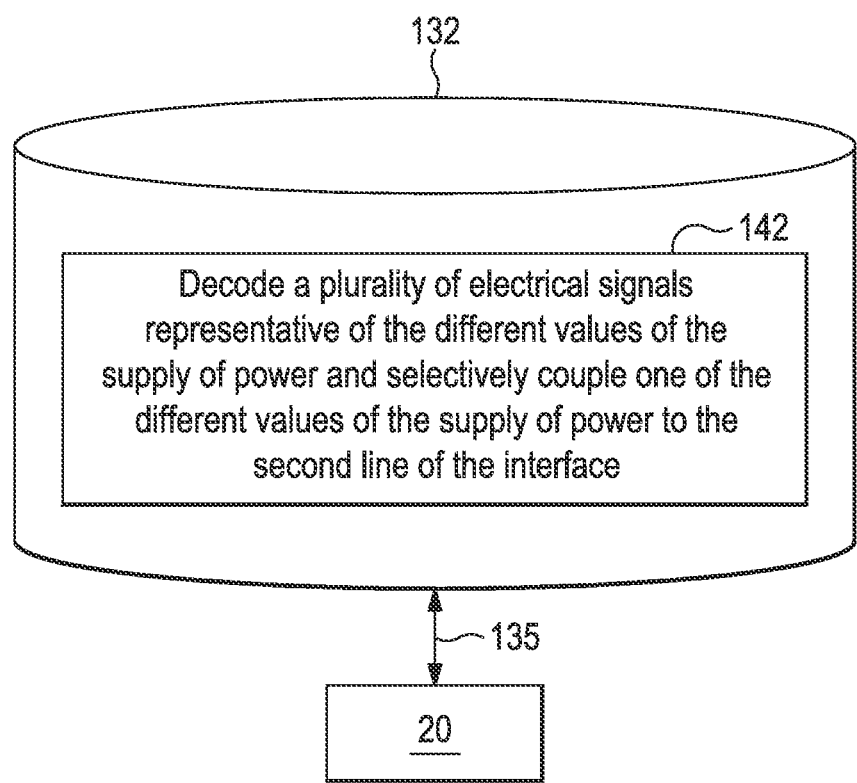
FIG. 7 is an example of the machine-readable non-transitory storage medium of FIG. 6 including additional instructions executable by the processor of the circuit in accordance with an implementation.

An example of machine-readable non-transitory storage medium 132 including additional instructions executable by processor 20 of the circuit is shown in FIG. 7. The supply of power may include a plurality of different values. In such cases, as can be seen in FIG. 7, machine-readable non-transitory storage medium 132 includes additional instructions that, when executed by the processor 20 of the circuit, cause processor 20 to decode a plurality of electrical signals representative of the different values of the supply of power and selectively couple one of the different values of the supply of power to the second line of the interface, as indicated by block 142.

Although several drawings have been described and illustrated in detail, it is to be understood that the same are intended by way of illustration and example. These examples are not intended to be exhaustive or to be limited to the precise form disclosed. Modifications and variations may well be apparent. For example, although various values have been given for the components of circuits 28 and 66, it is to be understood that other values may be utilized in either or both of circuits 28 and 66.

Additionally, reference to an element in the singular is not intended to mean one, unless explicitly so stated, but rather means at least one. Furthermore, unless specifically stated, any method elements are not limited to the sequence or order described and illustrated. Moreover, no element or component is intended to be dedicated to the public regardless of whether the element or component is explicitly recited in the following claims.

What is claimed is:

1. A circuit, comprising:
   a supply of power;
   an interface including a first line and a second line; and
   a processor to:
      identify a first predetermined electrical state on the first line of the interface,
      identify a second predetermined electrical state on the second line of the interface, and
      selectively couple the supply of power to the second line of the interface when the first predetermined electrical state is identified on the first line of the interface and the second predetermined electrical state is identified on the second line of the interface.

2. The circuit of claim 1, further comprising a first switch coupled to the processor to be selectively moveable between a first position to couple the second line of the interface to the processor and a second position to couple the second line of the interface to the supply of power.

3. The circuit of claim 2, further comprising a second switch coupled to the processor via the second line of the interface, the second switch including a third position and a fourth position that selectively define a value of the second predetermined electrical state.

4. The circuit of claim 1, further comprising a machine-readable non-transitory storage medium including instructions that, when executed by the processor, cause the processor to at least one of identify the first predetermined electrical state, identify the second predetermined electrical state, and selectively couple the supply of power to the second line of the interface.

5. The circuit of claim 1, wherein the interface includes a High-Definition Multimedia Interface, the first line includes pin 14 of the High-Definition Multimedia Interface, and the second line includes pin 18 of the High-Definition Multimedia Interface.

6. The circuit of claim 1, wherein the first predetermined value corresponds to a first logical low value and wherein the second predetermined value corresponds to a second logical low value.

7. The circuit of claim 2, wherein the third position defines a logical high-value and the fourth position defines a logical low value.

8. The circuit of claim 7, wherein the fourth position defines the logical low value via a resistor and ground.

9. The circuit of claim 3, wherein the first switch is part of a first electronic device and the second switch is part of a second electronic device connectable to the first electronic device by the interface.

10. The circuit of claim 9, wherein the first electronic device further comprises a voltage source and a first resistor connected to the voltage source to define a logical high-value for the first line and wherein the second electronic device further comprises a ground, a second resistor connected to the ground to define a logical low value for the first line.

11. The circuit of claim 10, wherein connection of the first and second devices by the second line is to cause the first line to change from the logical high-value for the first line to the logical low value for the first line, the logical low value for the first line corresponding to the first predetermined electrical state.

12. The circuit of claim 11, wherein the second electronic device comprises:
   a second voltage source defining a logical high-value for the second line when the second switch is in the third position; and
   a third resistor connected to ground to define a logical low value for the second line when the second switch is in the fourth position.

13. The circuit of claim 9, wherein the first electronic device is to supply power to the second electronic device via the second line.

14. The circuit of claim 13, wherein the first electronic device is the sole source of power for the second electronic device.

15. The circuit of claim 3 further comprising:
   a first voltage source and a first resistor connected to the first voltage source to define a logical high-value for the first line; and
   a ground and a second resistor connected to the ground to define a logical low value for the first line.

16. The circuit of claim 15 further comprising:
   a second voltage source defining a logical high-value for the second line when the second switch is in the third position; and
   a third resistor connected to the ground to define a logical low value for the second line when the second switch is in the fourth position.

17. The circuit of claim 16, wherein the logical high-value for the first line is 5 V DC, wherein the logical high-value for the second line is 5 V DC, wherein the first resistor has a value of between 10 Ohms and 100 Kilo Ohms and wherein the third resistor has a value of between 10 Ohms and 100 Kilo Ohms.

18. The circuit of claim 2, wherein the supply of power, the processor and the switch are part of a first electronic device that is to supply power to a second electronic device through the interface via the second line.

19. The circuit of claim 1, wherein the processor does not couple the supply of power to the second line of the interface if either the first predetermined electrical state is not identified on the first line by the processor or the second predetermined electrical state is not identified on the second line by the processor.

* * * * *